(12) United States Patent
Koseki et al.

(10) Patent No.: US 7,705,266 B2
(45) Date of Patent: Apr. 27, 2010

(54) HYBRID LASER PROCESSING APPARATUS

(75) Inventors: Ryoji Koseki, Ishikawa-Ken (JP); Motoi Sasaki, Ishikawa-Ken (JP); Yoshihiro Kawahara, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 427 days.

(21) Appl. No.: 11/885,854

(22) PCT Filed: Oct. 20, 2005

(86) PCT No.: PCT/JP2005/019298

§ 371 (c)(1),
(2), (4) Date: Sep. 6, 2007

(87) PCT Pub. No.: WO2006/100798

PCT Pub. Date: Sep. 28, 2006

(65) Prior Publication Data

US 2008/0169275 A1    Jul. 17, 2008

(30) Foreign Application Priority Data

Mar. 18, 2005    (JP) .............................. 2005-079458

(51) Int. Cl.
*B23K 26/14*    (2006.01)
*B23K 26/16*    (2006.01)
*B23K 26/38*    (2006.01)

(52) U.S. Cl. .............................. 219/121.67; 219/121.84

(58) Field of Classification Search ................................ 219/121.67–121.72, 121.84
See application file for complete search history.

(56) References Cited

U.S. PATENT DOCUMENTS

| | | | | |
|---|---|---|---|---|
| 4,952,771 A | * | 8/1990 | Wrobel | 219/121.67 |
| 5,356,081 A | * | 10/1994 | Sellar | 241/1 |
| 5,902,499 A | * | 5/1999 | Richerzhagen | 219/121.84 |

FOREIGN PATENT DOCUMENTS

| | | |
|---|---|---|
| JP | 10-500903 | 1/1998 |
| JP | 2001-321977 | 11/2001 |
| JP | 2003-151924 | 5/2003 |

* cited by examiner

*Primary Examiner*—Samuel M Heinrich
(74) *Attorney, Agent, or Firm*—Flynn, Thiel, Boutell & Tanis, P.C.

(57) ABSTRACT

A hybrid laser processing apparatus 1 includes a laser oscillator 4 which oscillates a laser beam L, a high-pressure pump 5 which supplies liquid, wherein liquid supplied from the high-pressure pump 5 is injected from an injection nozzle 13 provided at a tip of a processing head 6 and becomes a liquid column W to reach an object to be processed 2.

A first inclined plane 13*b* which reduces the diameter toward the object to be processed 2 is formed in the injection nozzle 13, the condensing lens 12 which condenses the laser beam L is designed so that the focus of the laser beam L is positioned beyond the injection nozzle 13 and closer to the side of the object to be processed 2 and the laser beam L on the side outer than the minimum diameter part 13*d* is reflected on the first inclined plane 13*b* and thereafter guided to the liquid column W.

Positional matching of the condensing lens and the injection nozzle is simple and the guided laser beam does not pop out of the liquid column. Moreover, manufacturing costs and running costs can be reduced.

4 Claims, 4 Drawing Sheets

HYBRID LASER PROCESSING APPARATUS

TECHNICAL FIELD

The present invention relates to a hybrid laser processing apparatus, and specifically relates to a hybrid laser processing apparatus which guides a laser beam to a liquid column injected by an injection nozzle to carry out processing on an object to be processed.

BACKGROUND ART

Conventionally, there is known a hybrid laser processing apparatus comprising: an injection nozzle including an injection hole; liquid supply means for supplying the relevent injection nozzle with high-pressure liquid; a laser oscillator oscillating a laser beam; and a condensing lens condensing the laser beam oscillated from the laser oscillator to inject the liquid supplied from the liquid supplying means in a shape of a liquid column from the injection holes to outside and to guide a laser beam to the liquid column with a condensing lens to carry out processing on the object to be processed.

As such a hybrid laser processing apparatus, there is known the one that is provided with a nozzle block including a nozzle passage formed at a tip of a processing head to inject a liquid column and a focus lens focusing a laser beam onto an entrance orifice of the above described nozzle passage to, thereby, guide the laser beam to the liquid column injected from the nozzle passage (Patent Document 1).

In addition, as another hybrid laser processing apparatus, there is known the one including a cylindrical plane and a conical plane being formed to reduce diameters toward an object to be processed inside the processing head so that water is injected from the tip of the cylindrical plane in a shape of a column and those conical plane and cylindrical plane reflect a laser beam to, thereby, guide a laser beam to the injected water (Patent Document 2).

Patent Document 1: National Publication of International Patent Application No. H10-500903
Patent Document 2: Japanese Patent Laid-Open No. 2001-321977

DISCLOSURE OF THE INVENTION

Problems to be Solved by the Invention

However, in the case of Patent Document 1, the focus lens has to place the focus of the laser beam in the entrance orifice of the nozzle passage and the focus of the laser beam becomes hardly adjustable as the diameter of the entrance orifice becomes smaller and smaller.

In addition, in the case of the Patent Document 2, the laser beam is repeatedly reflected on the conical plane and the cylindrical plane. Consequently, the incident angle of the laser beam guided to the injected water column to the boundary interface of the water column becomes too small, giving rise to such a problem that the laser beam pops out of the water column.

Moreover, the above described conical plane and the cylindrical plane reflect the laser beam a lot of times. Therefore, those conical plane and cylindrical plane need to undergo processing such as mirror-like finishing in their entirety to make the expensive cost for the processing head a problem.

In view of such a problem, the present invention provides a hybrid laser processing apparatus, which is easily adjustable in the focus position of a laser beam by a condensing lens so that no guided laser beam pops out from the liquid column to outside and the manufacturing cost thereof can be made inexpensive.

Means for Solving the Problems

That is, a hybrid laser processing apparatus of the present invention comprises an injection nozzle including an injection hole; liquid supplying means for supplying the injection nozzle with high-pressure liquid; a laser oscillator oscillating a laser beam; and a condensing lens condensing the laser beam oscillated from the laser oscillator to inject the liquid supplied from the liquid supplying means in a shape of a liquid column from the injection orifice to outside and to guide a laser beam to the liquid column with a condensing lens to carry out processing on the object to be processed, characterized in that, an inclined plane which reduces the diameter toward the object to be processed is formed at the entrance of the injection hole, the focus of the condensing lens is set inside the liquid column beyond a minimum diameter part of the inclined plane and closer to the side of the object to be processed and the laser beam irradiated to inside the injection hole is set to be reflected on the inclined plane and guided to the liquid column.

Advantages of the Invention

According to the above described invention, a liquid column is injected with the diameter of the minimum diameter part of the inclined plane formed in the above described injection hole. However, the condensing lens does not have to condense the laser beam smaller than the above described minimum diameter part but the laser beam is preferably made smaller than at least the entrance of the injection hole to condense the beam to get reflected on the inclined plane. Therefore, adjustment of the focus position of the laser beam becomes easy.

In addition, an intention to set the focus of the laser beam closer to the side of the object to be processed than to the minimum diameter part of the inclined plane to reflect the laser beam on the inclined surface results in making the conical angle of the laser beam to be condensed smaller than the conical angle of the inclined plane to enable thereby restraint of the number of times of reflection of the laser beam on the inclined plane.

Therefore, the incident angle of the laser beam guided to the liquid column to the boundary interface between the liquid column and the outside atmosphere gets larger to prevent the laser beam from popping out to outside from the liquid column and, moreover, narrow the range of mirror-like finishing and the like inside the injection nozzle to enable cost reduction on the injection nozzle.

Best Mode for Carrying Out the Invention

Now an embodiment in illustration will be described below. FIG. 1 illustrates a hybrid laser processing apparatus 1 related to the present invention, which guides a laser beam L to a liquid column W formed by injection of liquid and, thereby, carries out cut processing to form an object to be processed 2 into a required shape.

That hybrid laser processing apparatus 1 comprises a processing table 3 which supports the object to be processed 2, a laser oscillator 4 which oscillates a laser beam L, a high-pressure pump 5 as liquid supplying means which supplies liquid such as water, a processing head 6 which injects liquid as a liquid column W toward the object to be processed 2 and guides the laser beam L to the liquid column W.

The above described processing table 3 is conventionally known and, therefore, will not be described in detail. The processing table 3 is designed to move the object to be processed 2 in the horizontal direction to the processing head 6. In addition, the processing head 6 is designed to move in the vertical direction with elevator means not illustrated in the drawing.

In the present embodiment, semiconductor wafer with thin plate thickness as the above described object to be processed 2 undergoes cut processing. Otherwise, epoxy resin plate or composite material and the like made of resin and metal can undergo cut processing. In addition, besides cut processing, the front surface of the object to be processed 2 can undergo groove processing as well.

In addition, the above described laser oscillator 4 is a YAG laser and enables CW oscillation or pulse oscillation according to processing. Oscillation cycle of outputs and pulse thereof are designed adjustable appropriately.

Moreover, otherwise, a semiconductor laser, $CO_2$ laser and the like are usable as the laser oscillator 4. In the case where wavelength of the laser beam L to be irradiated as in the $CO_2$ laser is apt to be absorbed by water, the liquid injected from the processing head 6 is preferably liquid which does not absorb the laser beam L.

Next, the above described processing head 6 will be described. The processing head 6 comprises a plate-like frame 11 fixed on an elevator means not illustrated in the drawing, a condensing lens 12 which condenses the above described laser beam L, an injection nozzle 13 which injects liquid supplied from the high-pressure pump 5 to form a liquid column W and guides the laser beam L to the relevant liquid column W, and adjusting means 14 which adjust the relative positions and angles between the above described condensing lens 12 and the injection nozzle 13.

Here, in FIG. 1, for convenience of description, a section on the lower side in the drawing (a portion lower than the sixth plate 41 to be described below) is a section subjected to cutting along the I-I section in FIG. 2.

The above described frame 11 is provided on the optical axis of the laser beam L provided by oscillation of the laser oscillator 4. A circular through hole 11a is formed in the position where the optical axis of the laser beam L passes.

The above described condensing lens 12 is arranged on the optical axis of the laser beam L and is retained at the lower end of a cylindrical lens holder 21. That lens holder 21 is fixed on the lower plane of the frame 11 through the substantially cross-like (see FIG. 2) attachment stay 22.

Here, FIG. 2 is a cross section of FIG. 1 cut along the II-II section. However, for convenience of description, a second retaining cylinder 28b to be described below will be omitted from illustration.

In addition, the above described injection nozzle 13 is also arranged on the optical axis of the laser beam L. That injection nozzle 13 is retained at the lower end of a cylindrical nozzle holder 23 and the relevant nozzle holder 23 is designed to move by the above described adjusting means 14.

FIG. 3 illustrates an enlarged diagram of the above described injection nozzle 13 and nozzle holder 23. A small diameter part 23a, medium diameter part 23b and large diameter part 23c are formed in this order from the side of the object to be processed 2 in the above described nozzle holder 23. The above described injection nozzle 13 is fixed at the lower end of the above described small diameter part 23a with a ring-like retaining material 24.

The above described injection nozzle 13 is made of stainless steel. An injection hole 13a is formed in the center of the injection nozzle 13. In the injection hole 13a, a first inclined plane 13b which reduces diameter toward the object to be processed 2, and a second inclined plane 13c which is formed closer to the side of the object to be processed 2 than to the relevant first inclined plane 13b and expands diameter toward the object to be processed 2.

The above described first inclined plane 13b and second inclined plane 13c are brought into connection at the minimum diameter part 13d. The above described first inclined plane 13b has undergone mirror-like finishing for reflecting the laser beam L.

In addition, as described below in detail, the angle of the above described first inclined plane 13b is set larger than the conical angle of the laser beam L condensed by the above described condensing lens 12.

A glass plate 26 is fit in the medium diameter part 23b of the above described nozzle holder 23 through a sealing member 25. That glass plate 26 is fixed with a nut 27 to be screwed together with the screw part having undergone processing in the inner circumference of the above described medium diameter part 23b.

In addition, in the position of the above described small diameter part 23a, four connecting ports 23d are formed in an equal distance concentrically around the small diameter part 23a as a center. That connecting port 23d is communicated to the small diameter part 23a through the liquid pass 23e. The liquid sent by the above described high-pressure pump 5 is supplied to inside the small diameter part 23a lower than the above described glass plate 26.

A through hole larger than the above described second inclined plane 13c in diameter is provided in the center of the above described retaining member 24. That through hole configures, together with the above described second inclined plane 13c, an air pocket P surrounding the liquid column W injected from the injection nozzle 13.

The above described adjusting means 14 comprises a retaining cylinder 28 which retains the above described nozzle holder 23, an X-Y axis stage 29 where the relevant retaining cylinder 28 is horizontally moved, a Z axis stage 30 where the X-Y axis stage 29 is moved vertically and an angle adjusting stage 31 where the angle of the Z axis stage 30 is changed.

The above described retaining cylinder 28 is configured by a cylindrical first retaining cylinder 28a and a second retaining cylinder 28b. The first retaining cylinder 28a therein is fixed on the above described X-Y axis stage 29. At the lower end of the second retaining cylinder 28b is fixed to the above described nozzle holder 23. The center axis of the injection hole 13a in the injection nozzle 13 and the center axes of the first and the second retaining cylinders 28a and 28b are designed to match.

In addition, the above described lens holder 21 is housed inside the above described second retaining cylinder 28b not in contact each other. The first retaining cylinder 28a and the second retaining cylinder 28b are linked together with the above described four linking member 32 (see FIG. 2) so as not to interfere the above described attachment stay 22 which fixes the above described lens holder 21 onto the frame 11.

The above described X-Y axis stage 29 comprises a first plate 33 which fixes the above described first retaining cylinder 28a, a second plate 34 which retains the first plate 33 from downward, a third plate 35 which retains the second plate 34 from downward and micrometers 36 and 37 which moves the first retaining cylinder 28a in the X axis direction in the left and right directions illustrated in the drawing and in the Y axis in the depth direction illustrated in the drawing.

Through holes 33a to 35a are respectively formed in the center of the above described first to third plates 33 to 35. To the through hole 33a of the first plate 33, the above described first retaining cylinder 28a is fixed so that the cylinder 28a hangs down by a fixing member 33b fixed on the upper plane of the first plate 33.

In addition, as illustrated in FIG. 4, the first to the third plates 33 to 35 are shaped planarly in substantially a square. The side planes thereof are placed so as to be orientated in the above described X axis direction and Y axis direction respectively.

Moreover, the above described first plate 33 and second plate 34 are designed to move relatively in the X axis direction by a rail not illustrated in the drawing formed in the X axis direction. The above described second plate 34 and third plate 35 are designed to move relatively in the Y axis direction by a rail 35b (see FIG. 1) formed in the Y axis direction.

And the above described micrometers 36 and 37 are fixed in the X axis direction and the Y axis direction respectively on the side plane of the above described second plate 34. On the side plane of the first plate 33, protrusion 33c is provided in a position that can be pressed by the above described micrometer 36. On the side plane of the third plate 35, protrusion 35c is provided in a position that can be pressed by the tip of the above described micrometer 37.

With such a configuration, the above described protrusion 33c is pressed by the micrometer 36 orientated in the X axis direction to enable the nozzle holder 23 to move in the X axis direction altogether with the retaining cylinder 28 and the first plate 33 in the X axis direction. In addition, operation of the micrometer 37 orientated in the Y axis direction enables the nozzle holder 23 to move in the Y axis direction altogether with the retaining cylinder 28, the first plate 33 and the second plate 34.

The above described Z axis stage 30 comprises a fourth plate 38 which fixes the above described third plate 35 on the upper plane thereof, a fifth plate 39 fixed on the above described angle adjusting stage 31 and two wheels 40 provided between the fourth and fifth plates 38 and 39. In the center of the fourth and fifth plates 38 and 39, the through holes 38a and 39a are formed in such a range that no contact takes place with the moving first retaining cylinder 28a.

Here, the above described wheel 40 moves the fourth plate 38 up and down by a conventionally known jack screw system and detailed description on the configuration thereof will be omitted.

According to that Z axis stage 30, any one of the above described wheels 40 is operated to enable the fourth plate 38 to remain in parallel to the fifth plate 39 and move up and enables the above described nozzle holder 23 to move up altogether with the retaining cylinder 28 and the X-Y axis stage 29.

And the angle adjusting stage 31 comprises a sixth plate 41 which fixes the above described Z axis stage 30 on the upper plane thereof, a support bolt 42 which pierces through the above described frame 11 to retain the sixth plate 41 at its tip from downward and two adjusting bolt 43 (see FIG. 5) which retains likewise the sixth plate 41 from downward.

As illustrated in FIG. 2, the above described sixth plate 41 is shaped in substantially a square. The above described support bolt 42 supports any corner of four corners of the sixth plate 41 from the lower plane. The above described adjusting bolt 43 is designed to support the corner in the position that sandwiches the above described support bolt 42.

As illustrated in FIG. 5, tips of the above described support bolt 42 and adjusting bolt 43 undergo processing to form a hemisphere. The tips thereof are designed to be housed in a concave part 44a of the receiving member 44 embedded in the six plate 41.

And, the above described adjusting bolts 43 are designed to include the tips of the bolts which can be moved up and down with a dial 43a positioning on the side of the lower plane of the frame 11. With those two adjusting bolts 43, inclination of the sixth plate 41 to the frame 11 can be changed.

That is, with the two adjusting bolts 43, the inclination of the above described nozzle holder 23 to the frame 11 can be adjusted altogether with the retaining cylinder 28, the x-y axis stage 29 and the Z axis stage 30.

According to thus configured adjusting means 14, with the X-Y axis stage 29 and the angle adjusting stage 31, the position and the angle of the liquid column W injected by the injection nozzle 13 can be brought into matching to the optical axis of the laser beam L irradiated by the laser oscillator 4.

In addition, with the Z axis stage 30, the focus position of the laser beam L condensed by the condensing lens 12 can be moved along the direction of the liquid column W.

FIG. 6 illustrates an enlarged diagram of the above described injection nozzle 13. In that drawing, the optical axis of the laser beam L and the center axis of the liquid column W injected from the injection nozzle 13 are adjusted to come into matching with the X-Y axis stage 29 of the above described adjusting means 14 and the angle adjusting stage 31.

In the present embodiment, diameter of the minimum diameter part 13d of the first inclined plane 13b of the injection hole 13a of the injection nozzle 13 is 50 μm, diameter of the maximum part 13e is 80 μm, distance from the minimum diameter part 13d to the maximum diameter part 13e in the Z axis direction is 100 μm. In addition, the conical angle θ1 of the first inclined plane is set to be larger than the conical angle θ2 of the laser beam L condensed by the condensing lens 12.

In that state, the above described high-pressure pump 5 supplies the interior of the nozzle holder 23 with liquid. Then the relevant liquid passes inside the small diameter part 23a of the nozzle holder 23 and is injected from the injection hole 13a of the above described injection nozzle 13 toward the object to be processed 2.

At that occasion, an air pocket P is formed in the lower part of the first inclined plane 13b by the through hole of the second inclined plane 13c and the retaining member 24. Therefore, the injected liquid does not diffuse but becomes a liquid column W with approximately the same diameter as the minimum diameter part 13d of the first inclined plane 13b and is injected.

Next, the laser oscillator 4 oscillates to generate the laser beam 4. That laser beam L is condensed by the condensing lens 12 and thereafter transmits through the above described glass plate 26 and the liquid fulfilling the interior of the small diameter part 23a of the nozzle holder 23 and is irradiated to the above described injection nozzle 13.

In the present embodiment, the above described Z axis stage 30 is adjusted. Thereby, the focus of the laser beam L is designed to be positioned beyond the minimum diameter part 13d of the above described first inclined plane 13b inside the liquid column W and the laser beam L is designed to be condensed smaller than the maximum diameter part 13e of the injection hole 13a.

Here, in FIG. 6, the focus of the laser beam L in the case of lacking in the injection nozzle 13 is illustrated by dashed lines.

Thus, the condensed laser beam L is reflected once on the first inclined plane 13b in the portion outside the minimum diameter part 13d. Thereafter reflection is repeated on the boundary interface in the above described liquid column W with the outside atmosphere at an incident angle larger than the critical angle and the laser beam L is guided to reach the object to be processed 2.

Thus, according to the hybrid laser processing apparatus 1 of the present embodiment, the focus of the laser beam L is set to inside the liquid column W beyond the minimum diameter part 13d of the first inclined plane 13b in the injection nozzle 13; the laser beam L positioned outside the minimum diameter part 13b is reflected on the above described first inclined plane 13b and is guided to inside the liquid column W. Therefore, even if the focus position of the laser beam L is deviated a little in the Z axis direction, the laser beam L can be guided to the liquid column W to simplify adjustment of the focus position of the laser beam L by the above described Z axis stage 30.

In contrast, the above described Patent Document 1, the focus of the laser beam has to be set in the orifice part of the injection nozzle. Therefore, displacement of the focus position in the Z axis direction not only causes the laser beam to be reflected on the injection nozzle to refrain from being guided to inside the liquid column, but also cause the laser beam to be irradiated onto an unexpected wall plane, giving rise to a risk that the processing head itself will be damaged.

In addition, the laser beam L is designed to be reflected only once by the first inclined plane 13b. Therefore, the range of mirror-like finishing and the like for the injection nozzle 13 can be made small. In addition, in the case of the present embodiment, even if the reflection plane of the injection nozzle 13 is damaged by reflection of the laser beam L, only the injection nozzle 13 provided in the tip of the nozzle holder 23 is preferably exchanged. Therefore, the manufacturing cost and the running cost can be reduced.

In contrast, in the above described Patent Document 2, the laser beam is reflected a lot of times inside the injection nozzle. Therefore, the range of mirror-like finishing and the like has to be widened. In addition, in the case where the injection nozzle is damaged by reflection of the laser beam, the injection nozzle in its entirety will have to be replaced and repaired. Therefore manufacturing costs and the running cost used to increase.

Moreover, the laser beam L is designed to be reflected on the first inclined plane 13b only once. Therefore, the incident angle of the laser beam L reflected on the boundary interface inside the liquid column W with the outside atmosphere will not get small beyond necessity. But the incident angle of the laser beam on the boundary interface of the liquid column can be made larger than the critical angle. Therefore, the laser beam L will not pop out from the liquid column W into the outside atmosphere.

In contrasts, in the above described Patent Document 2, the laser beam is reflected inside the injection nozzle a lot of times. Each reflection narrows the incident angle on the wall plane inside the injection nozzle. Therefore, the incident angle of the laser beam on the boundary interface of the liquid column will get smaller than the critical angle likely to cause the laser beam to pop out into the outside atmosphere.

Here, in the above described embodiment, the injection nozzle 13 is made of stainless steel and the first inclined plane 13b has undergone mirror-like finishing. However, if the above described first inclined plane 13b undergoes coating of causing the above described first inclined plane 13b to reflect the laser beam L, the material of the injection nozzle 13 can be another material.

In addition, in the above described embodiment, the condensing lens 12 is fixed on the frame 11 so that the position and the angle of the condensing lens 12 cannot be adjusted. However, by providing adjusting means separately, the position and the angle of the condensing lens 12 can also be adjusted.

Figure 1:
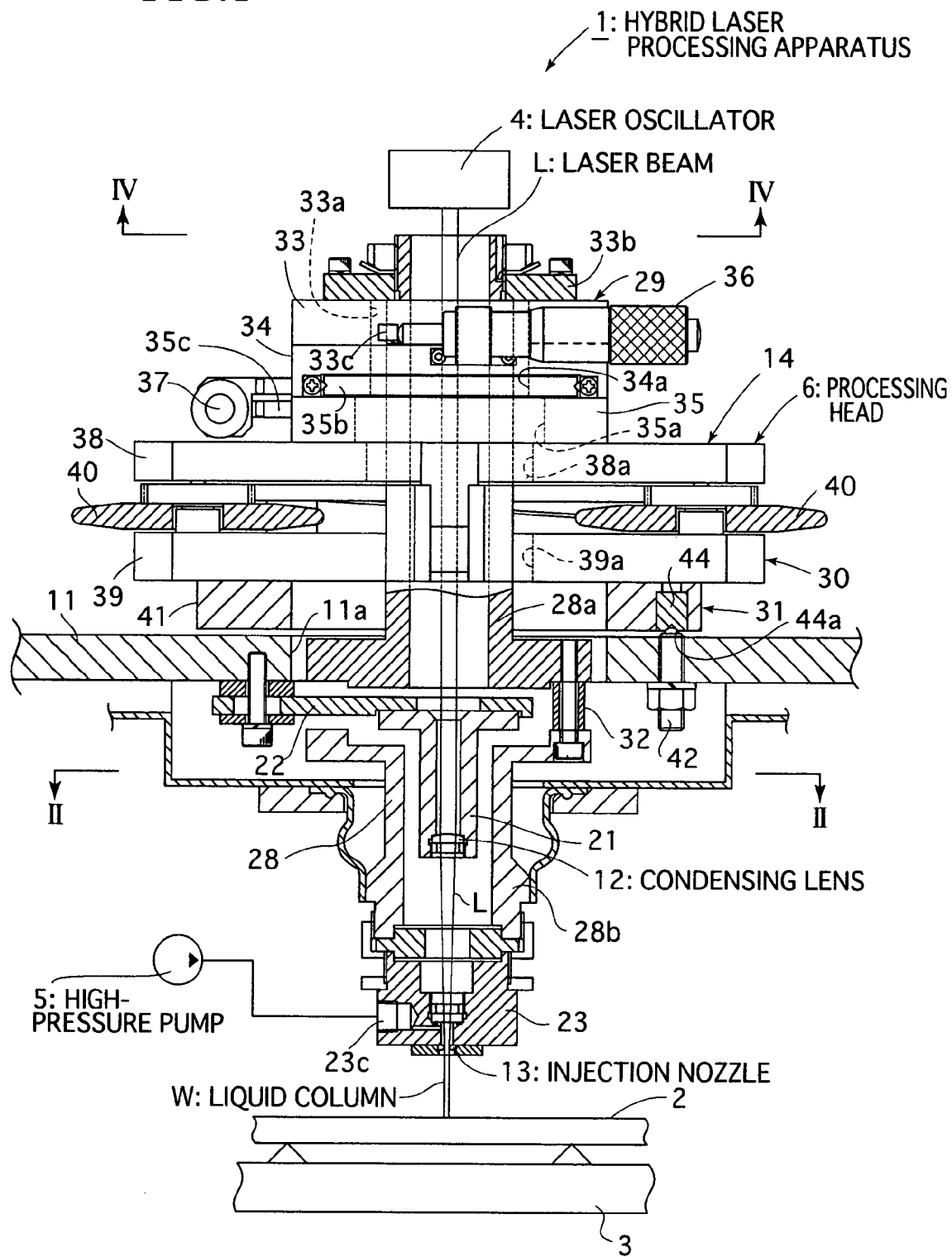
FIG. 1 is a cross section of a hybrid laser processing in the present embodiment.
Figure 2:
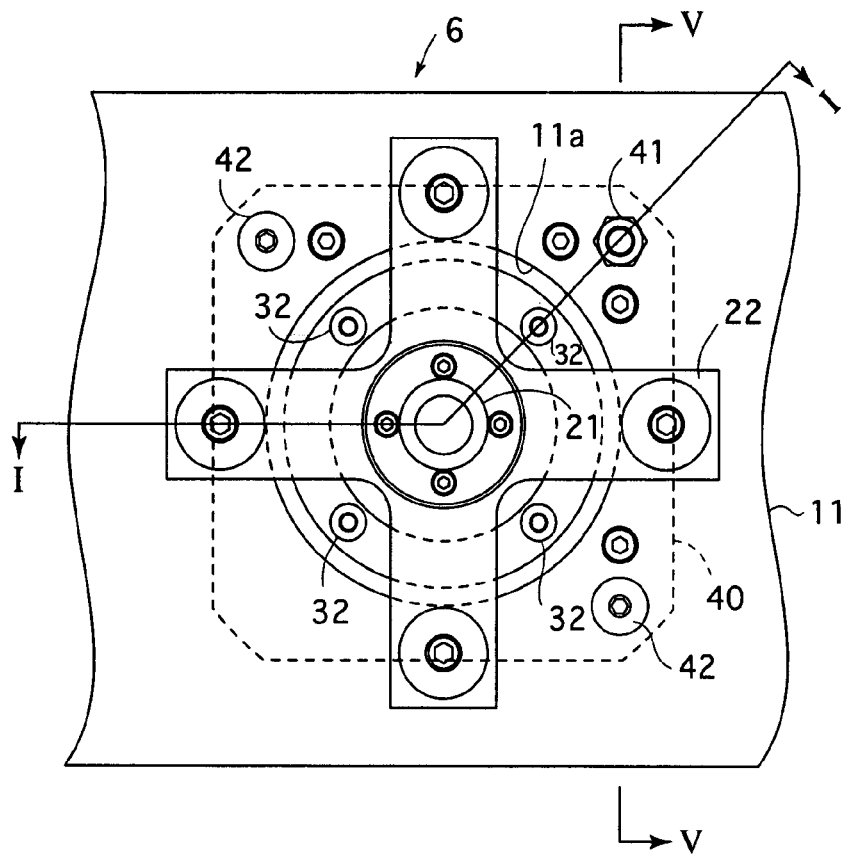
FIG. 2 is a plan diagram in a II-II section in FIG. 1.
Figure 3:
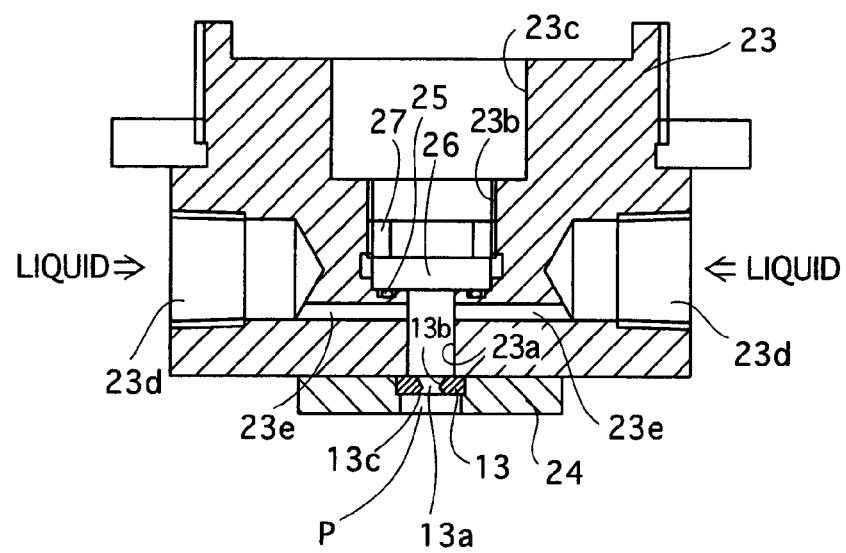
FIG. 3 is a section of an injection nozzle and a nozzle holder.
Figure 4:
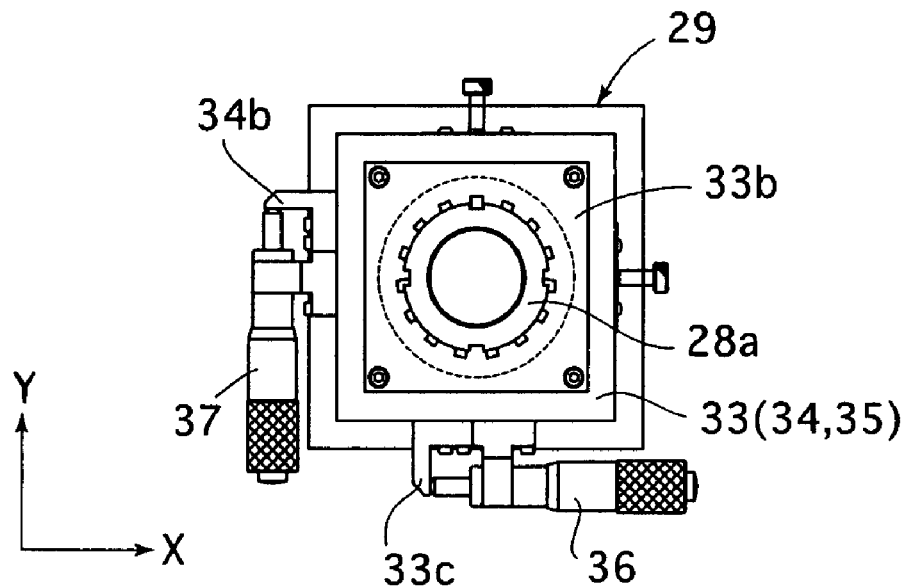
FIG. 4 is a plan diagram on an X-Y axis stage.
Figure 5:
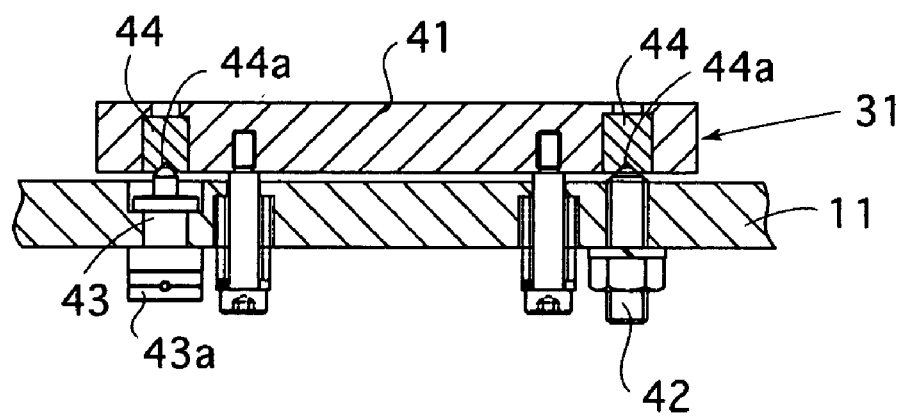
FIG. 5 is a section in a V-V section in FIG. 2.
Figure 6:
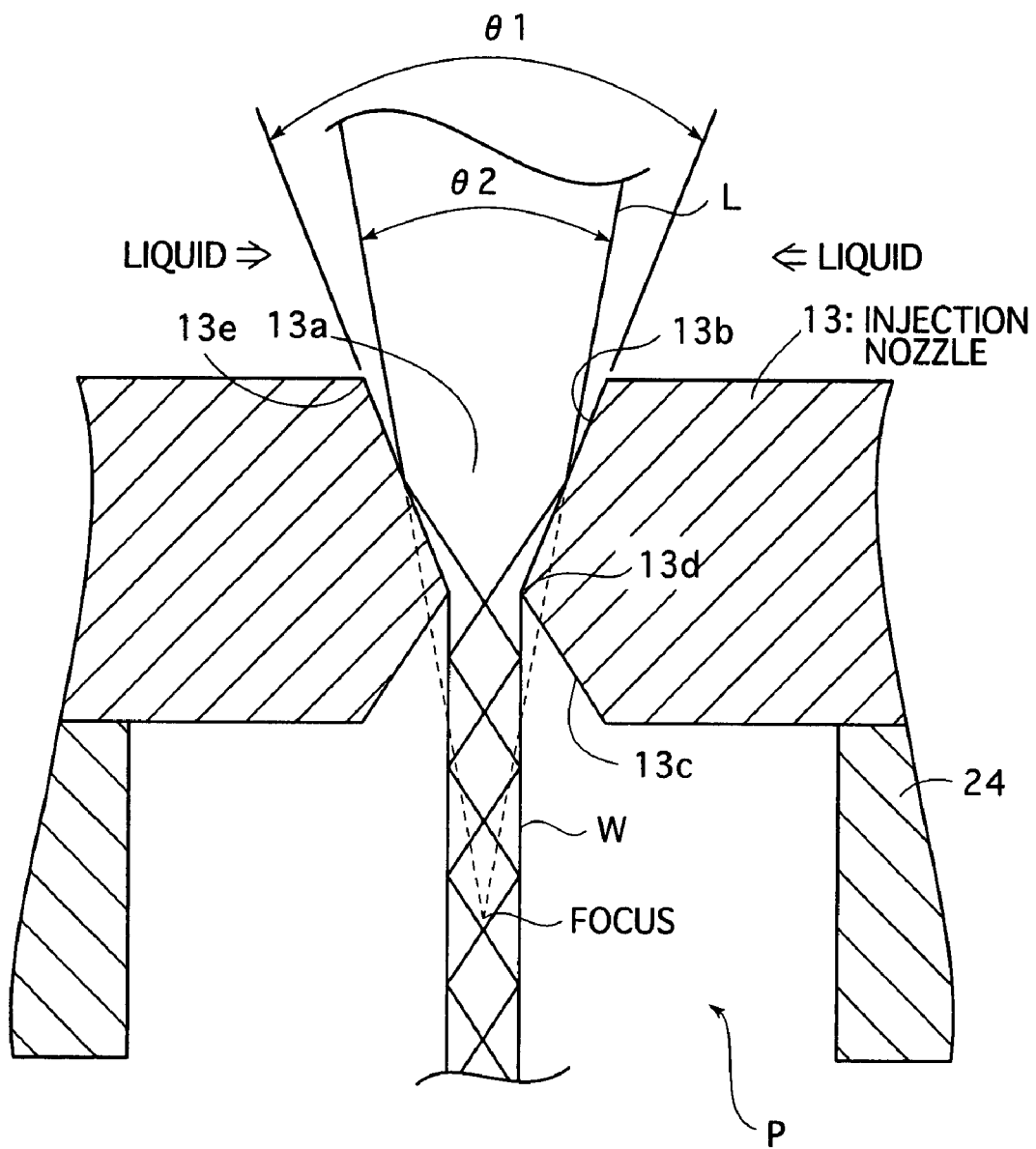
FIG. 6 is an enlarged section on the injection nozzle.

DESCRIPTION OF THE SYMBOLS 1 hybrid laser processing apparatus
2 object to be processed
4 laser oscillator
5 high-pressure pump
6 processing head
12 condensing lens
13 injection nozzle
13a injection hole
13b first inclined plane
13c second inclined plane
13d minimum diameter part
14 adjusting means
L laser beam
W liquid column

The invention claimed is:

1. A hybrid laser processing apparatus comprising: an injection nozzle including an injection hole; liquid supplying means for supplying the relevant injection nozzle with high-pressure liquid; a laser oscillator oscillating a laser beam; and a condensing lens condensing the laser beam oscillated from the laser oscillator to inject the liquid supplied from the liquid supplying means in a shape of a liquid column from the injection holes to outside and to guide a laser beam to the liquid column with a condensing lens to carry out processing on the object to be processed, characterized in that, an inclined plane which reduces the diameter toward the object to be processed is formed at the entrance of the injection hole, the focus of the condensing lens is set inside the liquid column beyond a minimum diameter part of the inclined plane and closer to the side of the object to be processed and the laser beam irradiated to inside the injection hole is set to be reflected on the inclined plane and guided to the liquid column.

2. The hybrid laser processing apparatus according to claim 1, characterized in that a second inclined plane is formed beyond the minimum diameter part of the inclined plane of the injection hole and closer to the side of the object to be processed to expand the diameter toward the object to be processed.

3. The hybrid laser processing apparatus according to claim 1, characterized in that an air pocket, which surrounds the liquid column, is formed on the side of the object to be processed rather than to the injection nozzle.

4. The hybrid laser processing apparatus according to claim 1, characterized in comprising adjusting means for adjusting positions of a laser beam condensed by the condensing lens and a liquid column injected from the injection nozzle by moving the condensing lens and the injection nozzle relatively.

* * * * *